July 20, 1926.

R. J. HEARNE 1,592,975

ELECTRICALLY HEATED ROLLER MACHINE

Filed Dec. 22, 1924    2 Sheets-Sheet 1

INVENTOR
Robert J. Hearne
BY
Chas. C. Gill
ATTORNEY

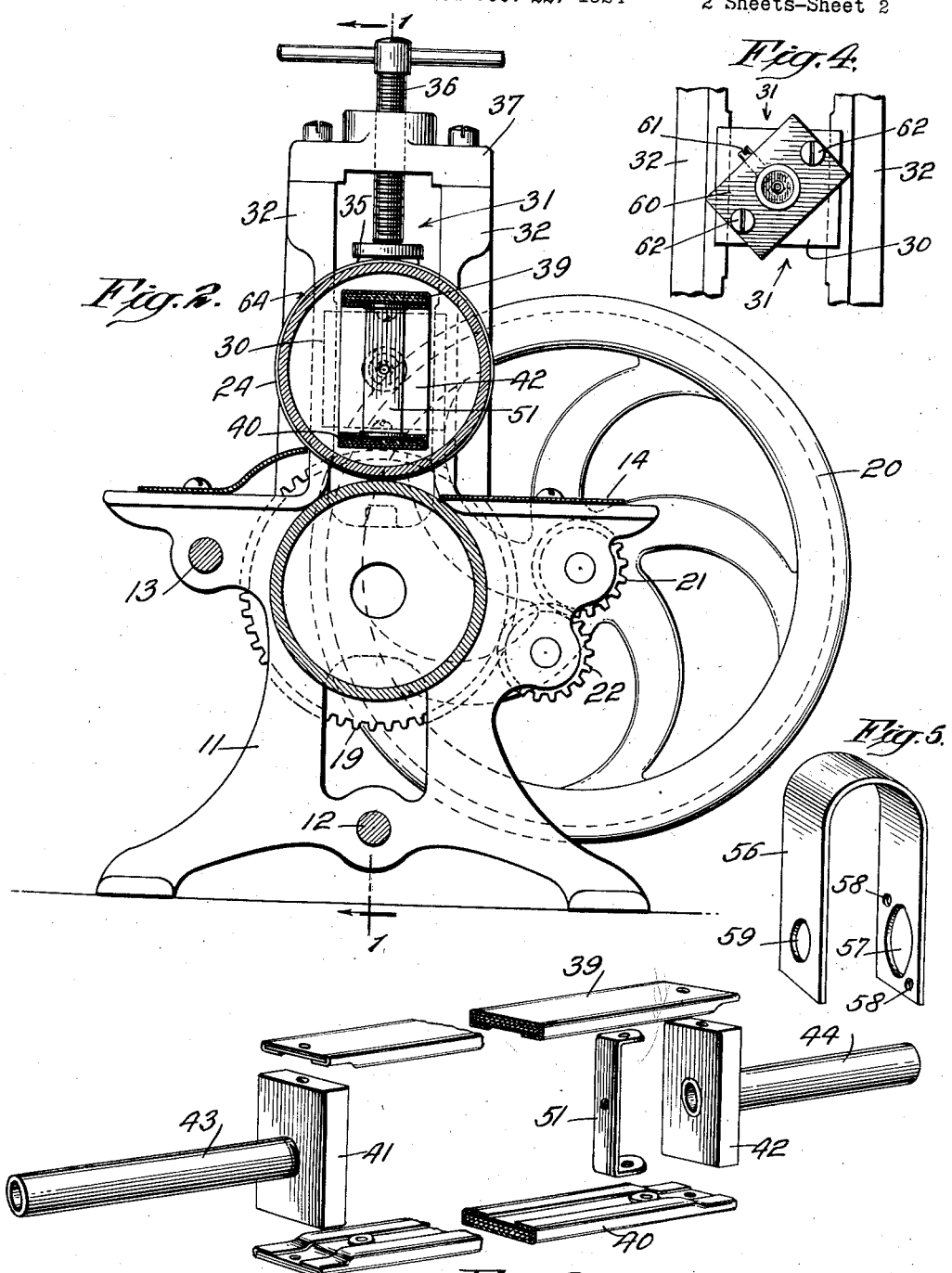
July 20, 1926.
R. J. HEARNE
1,592,975
ELECTRICALLY HEATED ROLLER MACHINE
Filed Dec. 22, 1924    2 Sheets-Sheet 2
INVENTOR
ROBERT J. HEARNE
BY
ATTORNEY Patented July 20, 1926.

1,592,975

UNITED STATES PATENT OFFICE.

ROBERT J. HEARNE, OF NEW YORK, N. Y.

ELECTRICALLY-HEATED ROLLER MACHINE.

Application filed December 22, 1924. Serial No. 757,314.

The invention relates to machines comprising two rotatory rollers between which the material under treatment is caused to travel by the rotation of said rollers against the same, one of said rollers having, by preference, a plain cylindrical surface and the other roller being hollow and electrically heated and having a surface suited to the work the machine is to perform, as embossing, impressing lines or other patterns into the surface of leather or other material, fluting, ironing, crenating, and the like.

The invention resides in the general structure of the machine and particularly in the construction, arrangement and mounting of the heating elements provided within the roller to be heated, these heating elements being stationary and flat and capable of use in multiples or singly as may be desired.

The invention will be fully understood from the detailed description hereinafter presented, reference being had to the accompanying drawings, in which:

Fig. 2 is a central vertical transverse section through the machine, taken on the dotted line 2—2 of Fig. 1;

Fig. 3 is a view in perspective, partly broken away, of the several parts of the heating elements shown in position in Figs. 1 and 2, said parts being shown detached from one another and ready for assembly;

Fig. 4 is an end view of a detail portion of the machine, taken from the right hand end of Fig. 1, and Fig. 5 is a perspective view of a hanger constituting a feature of the machine.

Figure 1:
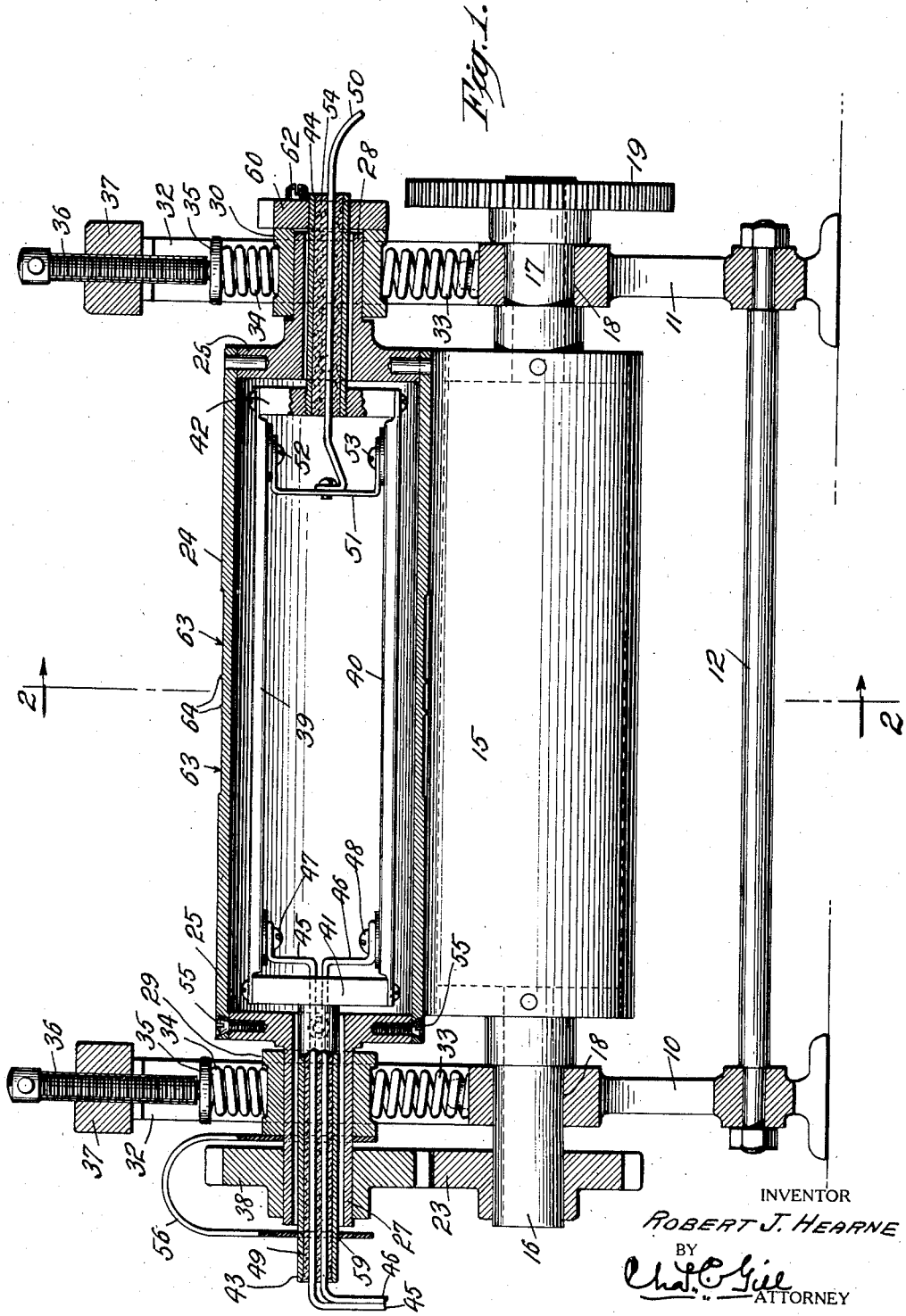
Fig. 1 is a central vertical longitudinal section through a roller-machine embodying my invention, the section being on the dotted line 1—1 of Fig. 2.

In the drawings 10, 11 designate the side-frames of the machine and 12, 13 suitable rods connecting said side-frames, while 14 denotes a convenient feed-table for the fabric or material to be treated.

Between the side-frames 10, 11 is mounted a hollow metal roller 15 which is usually a plain surfaced cold roller having end shafts 16, 17 journalled in stationary bearings 18 formed in the side frames 10, 11.

On the shaft 17 is secured a gear wheel 19, and this gear wheel receives rotary motion from the power wheel 20 through transmission gears 21, 22 and imparts the same to the roller 15 and to the shaft 16 thereof and also to the gear wheel 23 secured on said shaft 16.

Above the roller 15 and arranged to cooperate therewith is mounted the hollow metal roller 24 which is the operating or impression roller and contains specially arranged stationary electric heating means presently to be described. The roller 24 has secured within its opposite ends the heads 25, 26, respectively, which are formed with hollow shafts 27, 28, respectively, journalled in vertically slidable bearings 29, 30, respectively, held within vertical spaces 31 formed in the side frames 10, 11, said bearings being grooved on their vertical surfaces to engage and guide on ribs formed on the opposite members 32 of said frames defining said spaces (Fig. 4). The bearings 29, 30 are seated upon coiled springs 33 which are positioned within the aforesaid spaces 31 and rest upon rigid portions of the side frames 10, 11. Above the bearings 29, 30 and pressing downwardly against the same, are coiled springs 34 having caps 35 upon their upper ends which are engaged by vertical set screws 36 having threaded engagement with the cross-heads 37 secured upon the upper ends of and connecting the members 32, 32, of the respective side frames 10, 11.

The hollow shaft 27 has a gear wheel 38 secured upon it and this gear wheel meshes with the gear wheel 23 and receives motion therefrom and thereby the roller 24 has rotary motion imparted to it in harmony with the rotation of the roller 15 and counter thereto.

The electric heating means for the roller 24 may vary in detail but as shown comprise two longitudinal oppositely disposed flat heating elements 39, 40 of commercial type secured at their ends to non-conducting blocks 41, 42 which extend at right angles to the longitudinal axis of the roller 24 and are secured upon the inner ends of tubes 43, 44, respectively, which extend outwardly through the tubular shafts 27, 28 of the roller 24, as shown in Fig. 1. The tubes 43, 44 are free within but nearly fill the tubular shafts 27, 28, my purpose being to provide a nearly closed chamber within the roller 24 so as to confine the heat therein. Extending through the tube 43 are electric conductors 45, 46 which are insulated from each other and at their inner ends secured by screws 47, 48, respectively, to the respective heating elements 39, 40. The tube 43 is packed, around the conductors 45, 46, with hardened cementitious material 49. An electric conductor 50 extends inwardly through the tube 44 and at its inner end said conductor is secured to a bridge or bar 51 of conducting material lying between and at its ends being secured to the respective elements 39, 40 by means of binding screws 52, 53, respectively. The tube 44 is packed, around the conductor 50, with any suitable material 54 which may be hardened within the tube. The tubes 43, 44 are by the means described, closed against the ingress of air or egress of heat through them, and the hardened material or packing 49, 54 within the tubes 43, 44, serves to maintain the conductors 45, 46, 50 in correct position and to aid in preserving the unitary character of the heating devices, which will be handled as a unit and so introduced into and removed from the roller 24. It will be noted that the head 25 of the roller 24 is secured by screws 55, which when removed free said head to be removed from the roller, leaving the end of the roller entirely open to admit or permit the withdrawal of the heating devices.

I find it desirable to support the tubes 43, 44 from the slidable bearing blocks 29, 30, so that the heating devices may maintain a uniform relation to the roller 24 during the vertical movements of said roller while the machine is in use, and in the present instance I suspend the tube 43 from the bearing block 29 by means of a sheet metal hanger 56 of inverted U-shape (Figs. 1 and 5), one arm of which has a hole 57 to snugly pass upon the tubular shaft 27 and small holes 58 to receive screws by which said arm may be secured against the outer face of and to the bearing block 29 (Fig. 1) so as to move therewith, while the other arm of said hanger is formed with a hole 59 to snugly receive the tube 43, said hole 59 being positioned to maintain the concentric relation of said tube with the tubular shaft 27. The tube 44 extends through a hole in a block 60 to which the tube is secured by a set screw 61 and which block is secured by screws 62 to the slidable bearing block 30 so as to move therewith and maintain the concentric relation of the tube 44 with the tubular shaft 28. The hole in the block 60 snugly receives the tube 44 and is concentric with and of smaller diameter than the bore of the tubular shaft 28, and the screws 62 maintain the concentric relation of the hole in the block 60 with the bore of said shaft, and hence it will be seen that the tube 44 will remain in concentric relation to the tubular shaft 28, while being free of said shaft, during the use of the machine.

The surface of the roller 24 may be variously formed in accordance with the work to be carried out by the machine, and in the present instance said roller has an annular recess 63 and in the central portion thereof two annular ribs 64, which should a strip of leather for a belt be passed between the rollers 15, 24, would impress two parallel lines therein. The roller 24 having the recess 63 and ribs 64 is specially adapted for impressing lines on leather belting or on any similar material that might be caused to travel between the rollers. I prepare the surface of the roller 24 in various ways in accordance with the work the roller is to perform, as embossing, impressing patterns into a fabric, burning patterns into the surface of leather or other material, fluting, crenating, calendering, crimping, plaiting, and the like. If it should be desired to use the machine as a mangle, the roller 24 should have a smooth uniform surface.

The method of employing a machine of the type described is well understood. My invention pertains to the construction and assembly of the several parts of the machine and more particularly to the construction, assembly and mounting of the heating elements in a stationary manner within the rotatory roller 24. The unitary character of the heating elements 39, 40 and their mountings has been hereinbefore referred to and may be fully understood on reference to Fig. 1. The ends of the roller 24 are substantially closed by the heads 25, 26 and from the fact that the tubes 43, 44 substantially fill the otherwise hollow shafts 27, 28 and are themselves filled around the conductors 45, 46 and 50 with packing material. The blocks 41, 42 extend transversely of the roller 24 and they are not only well adapted to receive the flat heating elements 39, 40 but to position said elements approximately close to the inner walls of said roller whereby said elements are enabled to efficiently heat the roller. I only illustrate two flat heating elements 39, 40 secured to the blocks 41, 42 but obviously the number of heating elements employed may vary with the degree of heat required and other conditions. The heating unit provided by me is of durable, simple and inexpensive nature and capable of being readily installed, and said unit has proven to be highly efficient in practical use. In the machine described, the roller 24 is spring-pressed toward the roller 15 and against the material passing between the rollers, and provision is made to maintain the concentric relation of the heating unit to the roller 24 during the vertical movements of said roller while the machine is in practical operation. In the present illustration of my invention the concentric relation of the heating unit to the roller 24 is maintained by the hanger 56 and block 60, but the invention is not limited in every instance to this specific combination of parts, since the hanger 56 is made use of to bridge over the gear wheel 38, and this is due to the fact that the driving gears are positioned at the outer side of the side frame 10. In fluting machines ordinarily no driving gears are employed, since in these machines one roller drives the other, and hence in these machines I substitute for the hanger 56 another block 60. I follow this same practice in other types of the machine in which the gears 23, 38 are located at the inner side instead of the outer side of the side frame 10. I may add that when the machine is used for plaiting purposes, it performs a pressing operation, since the plaits or folds are formed in the fabric before the latter is delivered to the machine.

What I claim as my invention and desire to secure by Letters-Patent, is:

1. In a machine of the character described, a hollow metal operating or impression roller having heads in its ends equipped with hollow shafts, bearings for said shafts, an electric heating unit mounted within said roller for heating the same comprising tubular members extending through said hollow shafts and having blocks secured on their inner ends within the roller, a plurality of oppositely disposed flat resistance elements secured at their ends to said blocks, conductors extending through said tubular members for said resistance elements, means for rotating said roller and means for holding the heating unit against rotation, the adjacent surfaces of said tubular members and said hollow shafts being spaced from each other.

2. In a machine of the character described, a hollow metal operating or impression roller having heads in its ends equipped with hollow shafts, bearings for said shafts, an electric heating unit mounted within said roller for heating the same comprising tubular members extending through said hollow shafts and having blocks secured on their inner ends within said roller and extending transversely from said tubular members into near relation to the inner walls of said roller, a plurality of oppositely disposed flat resistance elements secured at their ends to said blocks, conductors extending through said tubular members for said resistance elements, means for rotating said roller and means for holding the heating unit against rotation, the adjacent surfaces of said tubular members and said hollow shafts being spaced from each other.

3. In a machine of the character described, a hollow metal operating or impression roller having heads in its ends equipped with hollow shafts, bearings for said shafts, an electric heating unit mounted within said roller for heating the same comprising tubular members extending through said hollow shafts and having blocks secured on their inner ends within the roller, a flat resistance element secured at its ends to said blocks, conductors extending through said tubular members for said resistance element, means positioning said conductors firmly within said tubular members and in fixed relation thereto, means for rotating said roller and means for holding the heating unit against rotation, the adjacent surfaces of said tubular members and said hollow shafts being spaced from each other.

4. In a machine of the character described, the combination with a rotatable hollow roller, of an electric heating unit fixedly held within said roller, said heating unit including spaced insulation blocks, a relatively thin resistance element extending longitudinally within the roller and secured to said insulation blocks, insulated supporting shafts secured to the insulation blocks and extending outwardly beyond the end limits of the roller and its bearings, and conductors extending through the insulated shafts for connection to the resistance element.

5. In a machine of the character described, the combination with a rotatable hollow roller, of a heating unit held against rotation within said roller, said heating unit including a pair of spaced insulation blocks extending transversely of the roller adjacent the ends thereof and being firmly supported by insulated shafts which extend outwardly beyond the ends of the roller and its bearings, a plurality of flat resistance elements extending between the insulation blocks and supported thereby, and conductors extending through the insulated shafts and connected to the resistance elements.

Signed at New York city, in the county of New York and State of New York, this 19th day of December, A. D. 1924.

ROBERT J. HEARNE.